US007005213B2

(12) United States Patent
Ndzebet et al.

(10) Patent No.: US 7,005,213 B2
(45) Date of Patent: Feb. 28, 2006

(54) IONICALLY CONDUCTIVE ADDITIVE FOR ZINC-BASED ANODE IN ALKALINE ELECTROCHEMICAL CELLS

(75) Inventors: Ernest Ndzebet, Middleton, WI (US); Stephanie R. Curtis, Pardeeville, WI (US); Viet H. Vu, Verona, WI (US)

(73) Assignee: Rayovac Corporation, Madison, WI (US)

( * ) Notice: Subject to any disclaimer, the term of this patent is extended or adjusted under 35 U.S.C. 154(b) by 0 days.

(21) Appl. No.: 10/147,606

(22) Filed: May 16, 2002

(65) Prior Publication Data

US 2002/0177043 A1 Nov. 28, 2002

Related U.S. Application Data

(60) Provisional application No. 60/293,588, filed on May 24, 2001.

(51) Int. Cl.
*H01M 4/58* (2006.01)
(52) U.S. Cl. ........................... 429/229; 429/232
(58) Field of Classification Search ............... 429/229, 429/231, 232, 212, 165, 163, 129, 247, 206
See application file for complete search history.

(56) References Cited

U.S. PATENT DOCUMENTS

| | | | |
|---|---|---|---|
| 4,007,472 A | 2/1977 | Land | |
| 4,042,760 A | 8/1977 | Land | |
| 4,069,578 A | 1/1978 | Kinsman | |
| 4,105,815 A | 8/1978 | Buckler | |
| 4,119,770 A | 10/1978 | Land | |
| 4,124,742 A | 11/1978 | Land et al. | |
| 4,145,485 A | 3/1979 | Kinsman | |
| 4,161,815 A | 7/1979 | Land et al. | |
| 4,172,319 A | 10/1979 | Bloom et al. | |
| 4,172,924 A | 10/1979 | Warszawski | |
| 4,185,144 A * | 1/1980 | Ames et al. ............ | 429/156 |
| 4,345,954 A | 8/1982 | Panchu | |
| 4,354,958 A | 10/1982 | Solomon | |
| 4,361,633 A | 11/1982 | Nel et al. | |
| 4,389,470 A | 6/1983 | Plasse | |
| 4,400,452 A | 8/1983 | Bruder | |
| 4,444,852 A | 4/1984 | Liu et al. | |
| 4,518,705 A | 5/1985 | Solomon et al. | |
| 4,539,275 A | 9/1985 | Plasse | |
| 4,608,325 A * | 8/1986 | Ismail .................... | 429/217 |
| 4,609,597 A | 9/1986 | Plasse | |
| 4,614,026 A | 9/1986 | Plasse | |
| 4,615,954 A | 10/1986 | Solomon et al. | |
| 4,664,993 A | 5/1987 | Sturgis et al. | |
| 4,756,717 A | 7/1988 | Sturgis et al. | |
| 4,927,514 A | 5/1990 | Solomon et al. | |
| 4,957,826 A | 9/1990 | Cheiky | |
| 5,240,793 A | 8/1993 | Glaeser | |
| 5,342,712 A | 8/1994 | Mieczkowska et al. | |
| 5,419,987 A * | 5/1995 | Goldstein et al. ......... | 429/229 |
| 5,424,145 A | 6/1995 | Tomantschger et al. | |
| 5,464,709 A | 11/1995 | Getz et al. | |
| 5,686,204 A | 11/1997 | Bennett et al. | |
| 5,744,258 A * | 4/1998 | Bai et al. .................. | 429/3 |
| 6,207,322 B1 * | 3/2001 | Kelsey et al. ............ | 429/206 |
| 6,347,033 B1 * | 2/2002 | Minnick et al. .......... | 361/327 |
| 2004/0013940 A1 * | 1/2004 | Horn ..................... | 429/209 |

FOREIGN PATENT DOCUMENTS

| | | |
|---|---|---|
| EP | 518407 | 12/1992 |
| EP | 0 700 104 | 3/1996 |
| EP | 755087 | 1/1997 |
| EP | 768723 | 4/1997 |
| JP | 058068877 A2 | 4/1983 |
| NL | 7508697 | 7/1975 |
| WO | WO 99/07030 | 2/1999 |
| WO | WO 99/50922 | 10/1999 |
| WO | WO 02/13304 A1 | 2/2002 |

OTHER PUBLICATIONS

Rennecker Limited (LTD); "About Smectite Clays;", no specific date available.
Amethyst Galleries, Inc.; "The Clay Mineral Group;" pp. 1-3, no specific date available.
Amethyst Galleries, Inc.; "The Mineral Montmorillonite;", no specific date available.
"Products and Chemistry;" pp. 1-5, no specific date available.
Laponite "garamite" "gelwhite" "claytone" "nanoclay" permont (Empty/Blank copie page), no specific date available.
Coche-Guerente et al., Anal. Chem. 2001, p. 3206, vol. 73.
Kirk-Othmer, Encyclopedia of Chemical Technology 4th Ed. pp. 599-633, vol. 5, John Wiley & Sons, Inc., New York, U.S.
Lacroix et al., Electroanalysis 1999, p. 1068, vol. 11.
Lewis, Richard J., Hawley's Condensed Chemical Dictionary 14th Ed., 2001, pp. 229, 274, 753, John Wiley & Sons, Inc., New York, U.S.
Senilou et al., Anal. Chem. Acta 1999, p. 117, vol. 401.
International Search Report from PCT/US 02/15607 dated Sep. 17, 2002.

* cited by examiner

*Primary Examiner*—Raymond Alejandro
(74) *Attorney, Agent, or Firm*—Senniger Powers

(57) ABSTRACT

An anode is provided for an electrochemical cell having an ionically conductive additive, such as Laponite® or any alternative clay suitable to improve the transport of hydroxyl ions into anode during discharge.

11 Claims, 3 Drawing Sheets

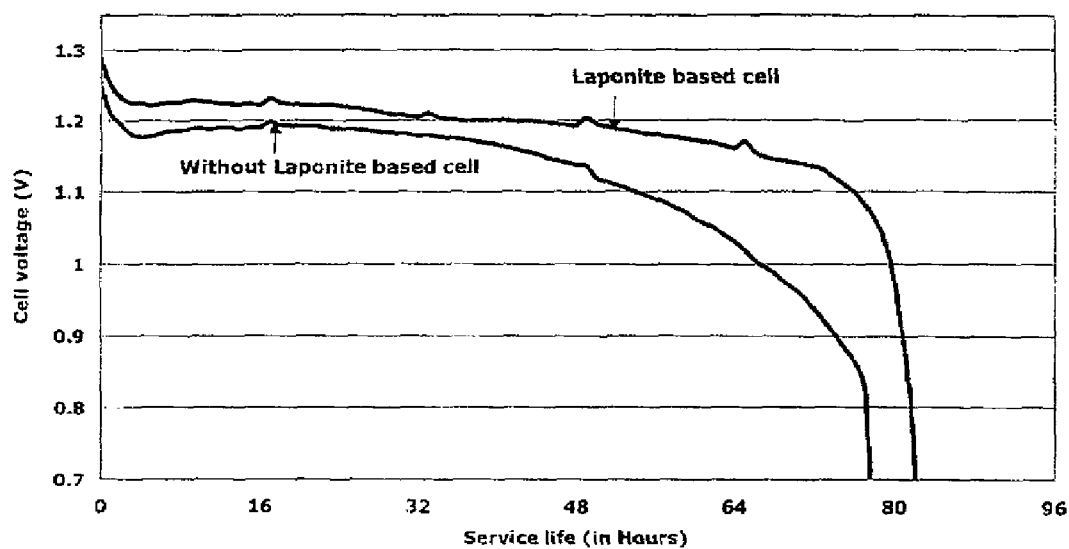
Fig 3: Discharge profile at 374 Ohm of Zinc Air 13 size cell
Test description: 16H/D 70F/50% (No delay)

IONICALLY CONDUCTIVE ADDITIVE FOR ZINC-BASED ANODE IN ALKALINE ELECTROCHEMICAL CELLS

CROSS-REFERENCE TO RELATED APPLICATIONS

The present application claims priority to U.S. Provisional Patent Application 60/293,588, filed on May 24, 2001, and entitled "Conformal Separator for an Electrochemical Cell" the disclosure of which is hereby incorporated by reference as if set forth in its entirety herein.

STATEMENT REGARDING FEDERALLY SPONSORED RESEARCH OR DEVELOPMENT

— —

BACKGROUND OF THE INVENTION

The present invention relates generally to the fabrication of alkaline electrochemical cells and, in particular, relates to the preparation of an anode having a mercury-free zinc-based anode.

Alkaline electrochemical cells such as metal-air batteries produce electricity by electrochemically coupling in a cell a reactive metallic anode to an air cathode through a suitable electrolyte. As is well known in the art, an air cathode is typically a sheet like member having opposite surfaces that are exposed to the atmosphere and to an aqueous electrolyte of the cell, respectively. During operation, oxygen from air dissociates at the cathode while metal of the anode oxidizes, thereby providing a usable electric current flow through the external circuit between the anode and the cathode.

Most metallic anodes are thermodynamically unstable in an aqueous neutral or alkaline electrolyte and, react with the electrolyte to corrode or oxidize the metal and generate hydrogen gas. This corrosive shelf-discharge side reaction can reduce both service and shelf life of alkaline electrochemical systems that use zinc as the anode active material. During discharge, electrochemical oxidation occurs at the anode, and metallic zinc is oxidized to zinc hydroxide, zincate ions, or zinc oxide. Under conditions such as high discharge rates or low alkaline electrolyte concentration, where the product of discharge is too densely attached to the surface, passivation of the zinc can occur. The presence of a solid phase zinc oxide or hydroxide film will interfere with the discharge efficiency of the zinc anode.

Mercury has traditionally been added to the zinc anode to improve the corrosion and discharge behavior of the anode. However, because mercury has been shown to be environmentally unfriendly, it has become more desirable to produce mercury-free anodes. Among various technologies for avoiding mercury, the most advanced in the prior art is to add a small amount of metal, such as lead, calcium, indium, bismuth, and combinations thereof, to the zinc to provide a zinc alloy. Unfortunately, it has been discovered that alkaline electrochemical cells using mercury-free zinc alloy containing such additives (mercury-free zinc, in particular) exhibit a significant drop in both operating voltage and service life when compared to zinc anodes having a mercury additive, especially when the cell discharged at a high rate. This is mainly attributed to either zinc particle surface passivation, caused by zinc oxide forming at the zinc surface, and/or anode polarization. These may both be caused by the lack of a sufficient quantity of hydroxyl ions in the anode, and/or a sufficiently even distribution of hydroxyl ions.

What is therefore needed is an environmentally friendly zinc-based anode having an extended service life and higher operating voltage than presently achieved.

BRIEF SUMMARY OF THE INVENTION

In accordance with one aspect of the invention, an electrochemical cell is provided having a container and a cathode disposed within the container. The container presents an inner surface that defines a centrally disposed void filled with a mixture of anode and electrolyte. A separator is disposed between the inner surface of the cathode and the anode. The anode mixture includes a mercury-free zinc powder and an ionically conductive clay additive dispersed throughout the mixture.

It is thus a general object of the invention to provide an environmentally friendly material that may be added to a zinc-based anode to improve the overall performance of the cell.

These and other aspects of the invention are not intended to define the scope of the invention for which purpose claims are provided. In the following description, reference is made to the accompanying drawings which form a part hereof, and which there is shown by way of illustration, and not limitation, preferred embodiments of the invention. Such embodiments do not define the scope of the invention and reference must therefore be made to the claims for this purpose.

BRIEF DESCRIPTION OF THE DRAWINGS

Reference is hereby made to the following figures in which like reference numerals correspond to like elements throughout, and in which:

FIG. 3 is a graph illustrating the performance of an electrochemical cell having an anode constructed in accordance with the preferred embodiment compared to an electrochemical cell having a conventional mercury-free zinc-based anode.

DETAILED DESCRIPTION OF THE PREFERRED EMBODIMENT

Figure 1:
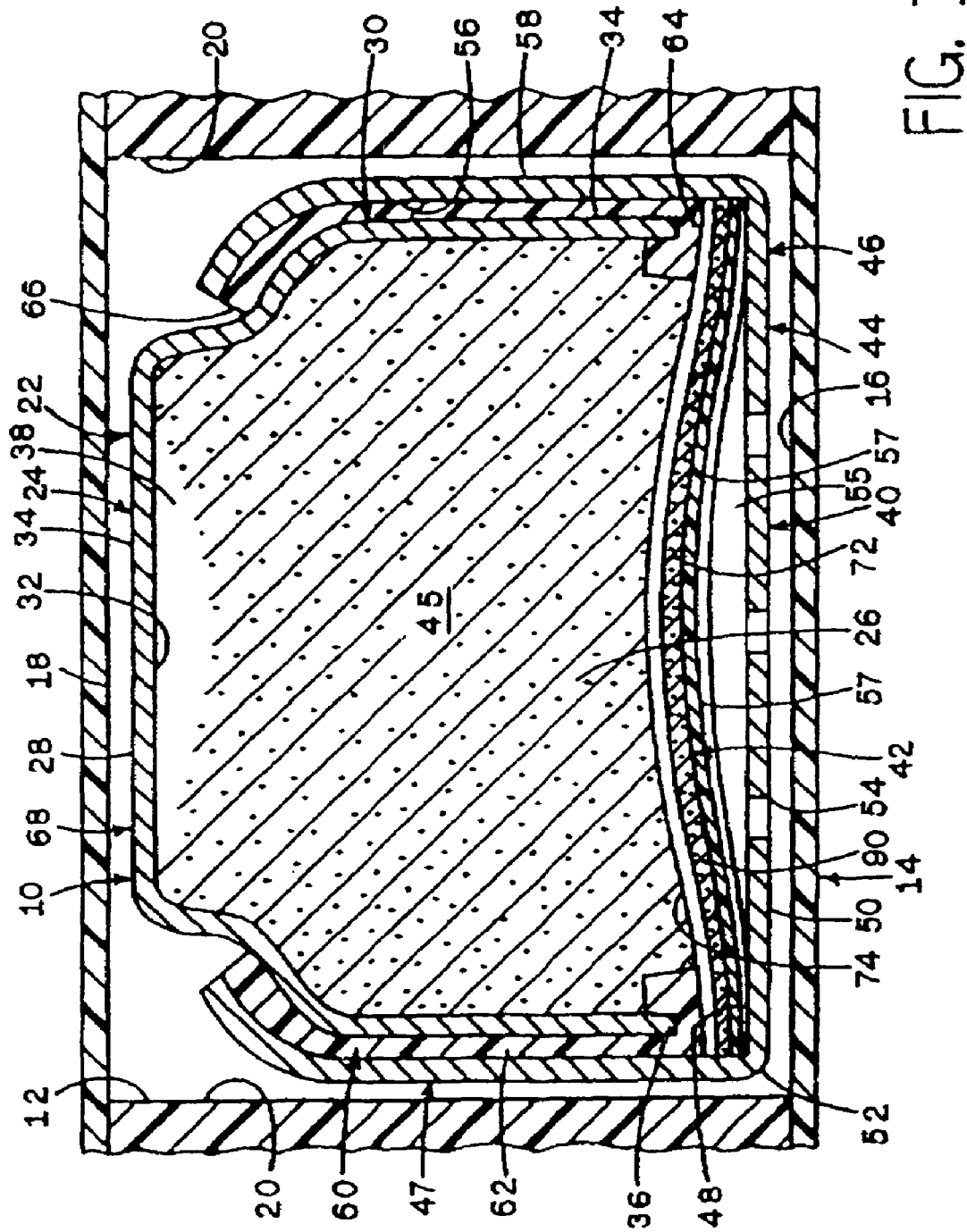
FIG. 1 is a schematic sectional side elevation view of a metal-air button cell constructed in accordance with the preferred embodiment of the present invention.

Referring to FIG. 1, a metal-air cell, and in particular a button cell 10, is disposed in a battery cavity 12 of an appliance 14. The cavity 12 is generally bounded by a bottom wall 16, a top wall 18, and side walls 20.

The negative electrode of the cell 10, commonly referred to as the anode 22, includes an anode can 24 defining an anode/electrolyte chamber 45, which contains a gelled anode 26 (mixture of anode and electrolyte). The electrolyte may comprise, for example, a gelling agent and a corrosion inhibitor. Conventional anodes may typically consist of a zinc paste and may be positioned in the manner described in U.S. Pat. No. 4,957,826, which is hereby incorporated by reference as if set forth in its entirety herein. The anode can 24 has a top wall 28 and an annular downwardly-depending side wall 30. Top wall 28 and side wall 30 have, in combination, an inner surface 32 and outer surface 34. Side wall 30 terminates in an annular can foot 36, and defines a cavity 38 within the anode can, which contains the gelled anode 26. It will become appreciated from the description below that the principles of the present invention are intended to be used in combination with any type of electrochemical cell having an anode whose active materials include mercury-free alloy powder.

The positive electrode, commonly referred to as the cathode 40, includes a cathode assembly 42 contained within a cathode can 44. Cathode can 44 has a bottom 46 and an annular upstanding side wall 47. Bottom 46 has a generally flat inner surface 48, a generally flat outer surface 50, and an outer perimeter 52 defined on the flat outer surface 50. An example of an air cathode suitable for use with the present invention is described in U.S. Pat. Nos. 4,354,958; 4,518,705; 4,615,954; 4,927,514; and 4,444,852, each of which is hereby incorporated by reference as if set forth in its entirety herein. A plurality of air ports 54 extend through the bottom 46 of the cathode can to provide avenues for air to flow into the cathode. An air reservoir 55 spaces the cathode assembly 42 from the bottom 46 and the corresponding air ports 54. A porous diffusion layer 57 fills the air reservoir 55, and presents an outer reaction surface 90 for the oxygen. Side wall 47 of the cathode can has an inner surface 56 and an outer surface 58. It should be appreciated that an air mover (not shown) could be installed to assist in air circulation.

The cathode assembly 42 includes an active layer 72 that is interposed between a separator 74 and air diffusion layer 57. Active layer 72 reduces the oxygen from air. Separator 74 is preferably a micro-porous plastic membrane, typically polypropylene, having the primary function of preventing anodic zinc particles from coming into physical contact with the remaining elements of the cathode assembly 42. Separator 74 however, does permit passage of hydroxyl ions and water therethrough to the cathode assembly.

The anode 22 is electrically insulated from the cathode 40 via a seal, that includes an annular side wall 62 disposed between the upstanding side wall 47 of the cathode can and the downwardly-depending side wall 30 of the anode can. A seal foot 64 is disposed generally between the can foot 36 of the anode can and the cathode assembly 42. A seal top 66 is positioned at the locus where the side wall 62 of seal 60 extends from between the side walls 30 and 47 adjacent the top of the cell.

The outer surface 68 of the cell 10 is thus defined by portions of the outer surface 34 of the top of the anode can, outer surface 58 of the side wall 47 of the cathode can, outer surface 50 of the bottom of the cathode can, and the top 66 of seal 60.

As described above, conventional metal-air cells having mercury-free zinc-based anodes have experienced a relatively short service life, especially when the cell is operating at a high discharge rate. It has been determined that this phenomenon may be attributed to either zinc particle surface passiviation and/or anode polarization due to poor characteristics of the transport of hydroxyl ions into the porous anode, as discussed above.

The present invention provides an inorganic and environmentally safe ionically conductive clay additive to zinc-based anodes that may be used in any alkaline cell to improve cell performance. In particular, it has been discovered that the addition of small amounts of a clay additive, such as Laponite®, into a zinc-based anode extends the service life and increases the operating voltage of the cell. It will be appreciated, however, that other clay additives could be used in accordance with the present invention, as described in more detail below.

Figure 2:
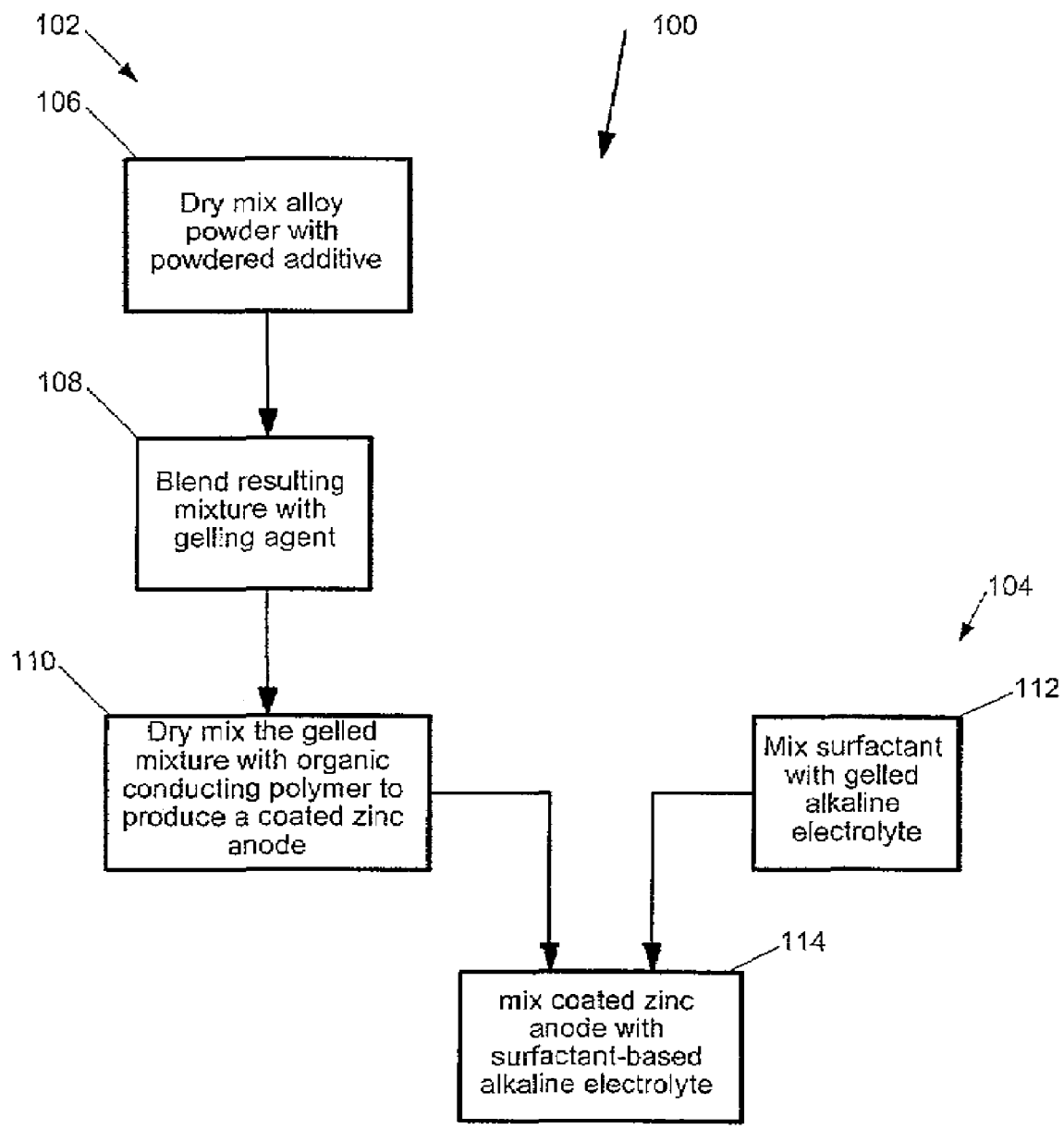
FIG. 2 is a flow chart illustrating the steps performed to fabricate a mercury-free zinc-based anode with the ionically conductive clay additive for the cell illustrated in FIG. 1.

Referring now to FIG. 2, a process 100 for fabricating the gelled anode 26 of electrochemical cell 10 in accordance with the preferred embodiment uses, broadly stated, a mercury-free alloy powder, an organic or inorganic corrosion inhibitor, an electronic conducting polymer, a gelling agent, an alkaline electrolyte containing zinc oxide, and clay. Fabrication process 100 includes an anode fabrication process 102 and an electrolyte fabrication process 104.

Process 102 begins at step 106, where the alloy powder, which preferably comprises zinc, is dry mixed with a clay powder, such as Laponite®. The zinc alloy powder provides the active anode material, and may contain small amounts of aluminum, indium, lead, and/or bismuth, which are known to improve the corrosion behavior of anodic zinc. Laponite® is a synthetic clay having the empirical formula $Na_{0.70}^{0.7+}[(Si_8Mg_{5.5}Li_{0.3})O_{20}(OH)_4]^{0.7-}$. The Laponite® used in accordance with the preferred embodiment is in the form of a fine dry powder having a BET surface area of approximately 300 $m^2/gm$. It should be appreciated that other clays could alternatively be added, as will be described in more detail below. At step 108, the alloy/clay mixture is blended with the gelling agent to produce a gelled anode mixture. Common gelling agents in anodes include carboxymethyl cellulose, polyacrylic acid, sodium polyacrylate (e.g., Carbopol 934 commercially available from B.F. Goodrich), and salts. It should be appreciated that process 100 could be modified in many ways while falling under the scope of the present invention. For example, the alloy powder could first by mixed with the gelling agent to produce a gelled anode mixture. The clay additive would then be added to the gelled anode mixture after step 108.

At step 110, the gelled mixture is dry mixed with the electronic conducting polymer to produce a coated zinc anode. The preferred electronic conducting polymer that was mixed with the anode of this invention is polyaniline, which is commercially available from Sigma-Aldrich, located in St, Louis, Mo. Other electronic conducting polymers such as polypyrrole or polyacetylene may also be used, though it should be appreciated that an electronic conducting polymer is not an essential ingredient to produce a functional anode suitable for use in an alkaline cell. The clay additive may also be added to the coated zinc anode after step 110. In fact, a skilled artisan will appreciate that while the steps 106–110 have been illustrated to demonstrate processes used to create an anode in accordance with the preferred embodiment, the order of the steps and the order of mixing the chemicals could differ from that illustrated and described herein with reference to FIG. 2.

In accordance with the electrolyte fabrication process 104, a surfactant is mixed with the gelled alkaline electrolyte to form a surfactant-based alkaline electrolyte at step 112. Preferred surfactants include Oxazoline type compounds, such as Alkaterge TIV, which is commercially available from Angus Chemical, located in Northbrook, Ill. At step 114, the anode produced using process 102 is mixed with the electrolyte produced using process 104 to form the gelled anode 26. It should be further appreciated that the clay additive could alternatively be added to the alkaline electrolyte at step 112 rather than adding the additive during anode fabrication process 102.

Advantageously, it has been found that the inorganic clay additive of the preferred embodiment exhibits high stability in a concentrated alkaline electrolyte, and has no effect on the gassing behavior of a zinc anode that is used as the active material in alkaline electrochemical cells. Additionally, because the clay is insoluble into an aqueous neutral or alkaline electrolyte solution, dispersed clay particles throughout the anode form an ionic network that enhances the transport of hydroxyl ions through the anode matrix. Consequently, the ionic conductivity inside the anode is improved over prior art additives that are soluble and therefore dissociate in electrolyte rather than forming ionic dispersed particles in the anode.

While Laponite® is the preferred clay additive to the alloy powder in accordance with the preferred embodiment, it should be appreciated that other types of clay, both natural and synthetic, may be used so long as the additive is an ionically conductive clay material that improves the transport of hydroxyl ions inside zinc anode matrix during discharge. This, in turn, delays anode passivation and decreases the polarization to provide greater cell performance, as illustrated in FIG. 3.

For example, those skilled in the art will recognize that other clays including, but not limited to, those in the Kaolinite group, the Montmorillonite/Smectite group, the Illiet (or Clay-mica) group, the Chlorite group, and bentonite. The additive could further be selected from a group of synthetic clays such as Garamite®, Gelwhite®, Claytone®, Nanoday®, and Permont® clays. More broadly stated, it is appreciated that most clays have in common a hydroxide group, particle charge, and at least one of silicon, aluminum, magnesium and lithium. Such clays are intended to be used in accordance with the present invention to achieve the advantages described above.

Furthermore, while the present invention has been described in combination with a metal-air button cell, an ionically conductive clay additive of the present invention may be added to any zinc-based anode in any type of electrochemical cell, including but not limited to, Alkaline Zinc-Manganese Oxide batteries, Zinc Silver Oxide batteries, Nickel Zinc batteries, and Zinc Bromine batteries, or any other cell having a zinc-based anode. It should also be appreciated that the present invention is applicable to any suitable cylindrical metal-air cells, such as those sized and shaped for size AA, AAA, AAAA, C, and D cells.

EXPERIMENTAL RESULTS

An anode constructed in accordance with the preferred embodiment was installed into a button cell and tested. In particular the anode was constructed with the following percentages, by weight, of additives with respect to the zinc powder: 0.3% Laponite; 0.02% polyaniline, 0.2% gelling agent, and 0.025% indium hydroxide.

Referring now to FIG. 3, the discharge characteristics of the gelled anode 26 produced in accordance with the preferred embodiment was evaluated in a zinc-air 13 size cell. The discharge profile of the cell at 374 Ohms was compared to a zinc-air 13 size cell having a mercury-free zinc anode with no Laponite® additive. From the results obtained, it may be concluded that Laponite® additive extends the service life of mercury-free zinc air cells and produces a higher operating voltage than mercury-free zinc-air cells without the Laponite® additive.

The invention has been described in connection with what are presently considered to be the most practical and preferred embodiments. However, the present invention has been presented by way of illustration and is not intended to be limited to the disclosed embodiments. Accordingly, those skilled in the art will realize that the invention is intended to encompass all modifications and alternative arrangement included within the spirit and scope of the invention, as set forth by the appended claims.

I claim:

1. An electrochemical cell comprising;
    a container;
    an anode;
    a cathode disposed within the container and having an inner surface that defines a centrally disposed void that is filled with a gelled anode comprising a gelled anode mixture comprising an electrolyte, a gelling agent selected from the group consisting of carboxymethyl cellulose, polyacrylic acid, sodium polyacrylate, and salts thereof, and an anode active material including a mercury-free anode active material including zinc and an ionically conductive clay additive that is dispersed throughout the gelled anode mixture and present in an amount effective to improve the transport of hydroxyl ions into the anode during a discharge; and
    a separator disposed between the inner surface of the cathode and the gelled anode mixture.

2. The electrochemical cell as set forth in claim 1 wherein the ionically conductive clay additive is a natural clay.

3. The electrochemical cell as set forth in claim 1 wherein the ionically conductive clay additive is a synthetic clay.

4. The electrochemical cell as set forth in claim 1 wherein the ionically conductive clay additive is a synthetic clay having the empirical formula $[Na_{0.70}^{0.7+}[(Si_8Mg_{5.5}Li_{0.3})O_{20}(OH)_4]^{0.7-}$.

5. The electrochemical cell as set forth in claim 1 wherein the ionically conductive clay additive is selected from the group consisting of kaolinite, montmorillonite, smectite, illiet, and chlorite.

6. The electrochemical cell as set forth in claim 1 wherein the ionically conductive clay additive is a compound comprising a hydroxide coupled with at least one of silicon, magnesium, and lithium.

7. The electrochemical cell as set forth in claim 1 wherein the electrochemical cell is a metal-air cell.

8. The electrochemical cell as set forth in claim 1 wherein the electrochemical cell is selected from the group consisting of an alkaline zinc manganese dioxide cell, a zinc silver oxide cell, a nickel zinc cell, and a zinc bromine cell.

9. The electrochemical cell as set forth in claim 1 wherein the gelled anode mixture further comprises a component selected from the group consisting of aluminum, indium, and lead.

10. The electrochemical cell as set forth in claim 1 wherein the ionically conductive clay additive is present in an amount of 0.3%.

11. The electrochemical cell as set forth in claim 1 wherein the ionically conductive clay additive has a BET surface area of approximately 300 $m^2$/gm.

* * * * *